United States Patent
Lewis et al.

(10) Patent No.: US 9,392,312 B1
(45) Date of Patent: Jul. 12, 2016

(54) SUBSCRIPTIONS TO CHANNELS ON THE WEB

(71) Applicant: Google Inc., Mountain View, CA (US)

(72) Inventors: Justin Lewis, Marina del Rey, CA (US);
Ruxandra Georgiana Paun, Santa Monica, CA (US)

(73) Assignee: GOOGLE INC., Mountain View, CA (US)

( * ) Notice: Subject to any disclaimer, the term of this patent is extended or adjusted under 35 U.S.C. 154(b) by 20 days.

(21) Appl. No.: 13/860,489

(22) Filed: Apr. 10, 2013

(51) Int. Cl.
*H04N 7/16* (2011.01)
*H04N 21/266* (2011.01)
*H04N 21/2543* (2011.01)
*H04N 21/262* (2011.01)

(52) U.S. Cl.
CPC .......... *H04N 21/266* (2013.01); *H04N 21/2543* (2013.01); *H04N 21/26225* (2013.01)

(58) Field of Classification Search
CPC ............... H04N 21/26225; H04N 21/2543
USPC ..................................... 725/25, 27
See application file for complete search history.

(56) References Cited

U.S. PATENT DOCUMENTS

| | | | |
|---|---|---|---|
| 8,831,409 B1* | 9/2014 | Chang et al. | 386/295 |
| 2001/0054179 A1* | 12/2001 | Nakamura et al. | 725/28 |
| 2004/0034873 A1* | 2/2004 | Zenoni | 725/135 |
| 2007/0250877 A1* | 10/2007 | Ozaki | 725/89 |
| 2011/0047134 A1* | 2/2011 | Zhang et al. | 707/702 |
| 2011/0179019 A1* | 7/2011 | Amer-Yahia et al. | 707/723 |
| 2012/0204201 A1* | 8/2012 | Cassidy et al. | 725/10 |
| 2013/0204873 A1* | 8/2013 | Vandermolen et al. | 707/736 |
| 2013/0263174 A1* | 10/2013 | Chaudhari | H04N 21/45 725/28 |

* cited by examiner

*Primary Examiner* — Pankaj Kumar
*Assistant Examiner* — Franklin Andramuno
(74) *Attorney, Agent, or Firm* — Lowenstein Sandler LLP

(57) ABSTRACT

A user of a content sharing platform is identified and one or more recommended channels of the content sharing platform are identified for the user. The user is temporarily subscribed to the one or more recommended channels and media items from the one or more recommended channels are provided to the user. The user is unsubscribed from the recommended channel or the temporary subscription to the channel is changed to a normal subscription based on user input, whether the user is presented with media items from the recommended channel, and/or whether the user has viewed media items from the recommended channel.

26 Claims, 8 Drawing Sheets

SUBSCRIPTIONS TO CHANNELS ON THE WEB

TECHNICAL FIELD

Embodiments of the present disclosure relate to the field of video watching services and, more particularly, to a method of subscribing to channels.

BACKGROUND

On the Internet, content sharing platforms or other applications allow users to upload, view, and share digital content such as media items. Such media items may include audio clips, movie clips, TV clips, and music videos, as well as amateur content such as video blogging, short original videos, pictures, photos, other multimedia content, etc. Users may use computing devices (such as smart phones, cellular phones, laptop computers, desktop computers, netbooks, tablet computers) to use, play, and/or consume media items (e.g., watch digital videos, and/or listen to digital music).

The content sharing platforms can include one or more channels or one or more channels can be viewable over the Internet. A channel is a mechanism for providing certain media items and/or for providing access to media items to subscribers. Media items for the channel can be selected by a user, uploaded by a user, selected by a content provider, or selected by a broadcaster. Users can subscribe to one or more channels. Upon subscribing, the user can view his or her subscriptions from the homepage of the content hosting site or from a user interface by clicking on a "Subscriptions" link/button. With many channels associated with a content sharing platforms or viewable over the Internet, it may be difficult for a user to find new media items to consume, to find new channels to subscribe to, and/or to decide which channels to subscribe to.

SUMMARY

The below summary is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In one embodiment, a method for subscribing to for subscribing to channels is presented. A first user of a content sharing platform may be identified. One or more recommended content channels of the content sharing platform may be identified. The user may be temporarily subscribed to the one or more recommended content channels may be provided a plurality of media items and/or provided access to the plurality of media items from the one or more recommended content channels. In another embodiment, the method may provide visual indicators for the plurality of media items and the visual indicators may denote that the plurality of media items are from the one or more recommended content channels.

In one embodiment, the method may determine that determine that a threshold period of time has passed and that the user has not viewed media items from the one or more recommended content channels and unsubscribe the user from the one or more recommended content channels. In another embodiment, the method may determine that a threshold number of media items from the one or more recommended content channels were presented to the first user and that the first user has not viewed media items from the one or more recommended content channels and may unsubscribing the first user from the one or more recommended content channels. In a further embodiment, the method may receive user input indicative of a request from the user to unsubscribe from the one or more recommended content channels and unsubscribe the first user from the one or more recommended content channels.

In one embodiment, the method may determine that the first user has viewed a threshold number of media items from the one or more recommended content channels and may change the temporary subscription to the one or more recommended content channels to a normal subscription (e.g., a subscription where the user is not unsubscribed from the channel even though the user has not viewed media items from the channel). In another embodiment, the method may receive user input indicating that the first user approves of (e.g., "likes") a first media item from the one or more recommended content channels and may change the temporary subscription to the one or more recommended content channels to a normal subscription based on the user input. In a further embodiment, the method may receive user input indicative of a request from the user to subscribe from the one or more recommended content channels and may change the temporary subscription to the one or more recommended content channels to a normal subscription.

In one embodiment, the method may identify the one or more recommended content channels by generating a plurality of affinity scores based on user interactions between the first user and a plurality of other users, each affinity score indicative of a level of connection between the first user and one user from the plurality of other users, identifying a subset of the plurality of other users based on the plurality of affinity scores, and identifying the one or more recommended content channels based on the subset of the of the plurality of other users. In additional embodiments, computing devices for performing the operations of the above described embodiments are also implemented. Additionally, in embodiments of the disclosure, a computer readable storage media may store instructions for performing the operations of the embodiments described herein.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only.

DETAILED DESCRIPTION

Figure 1:
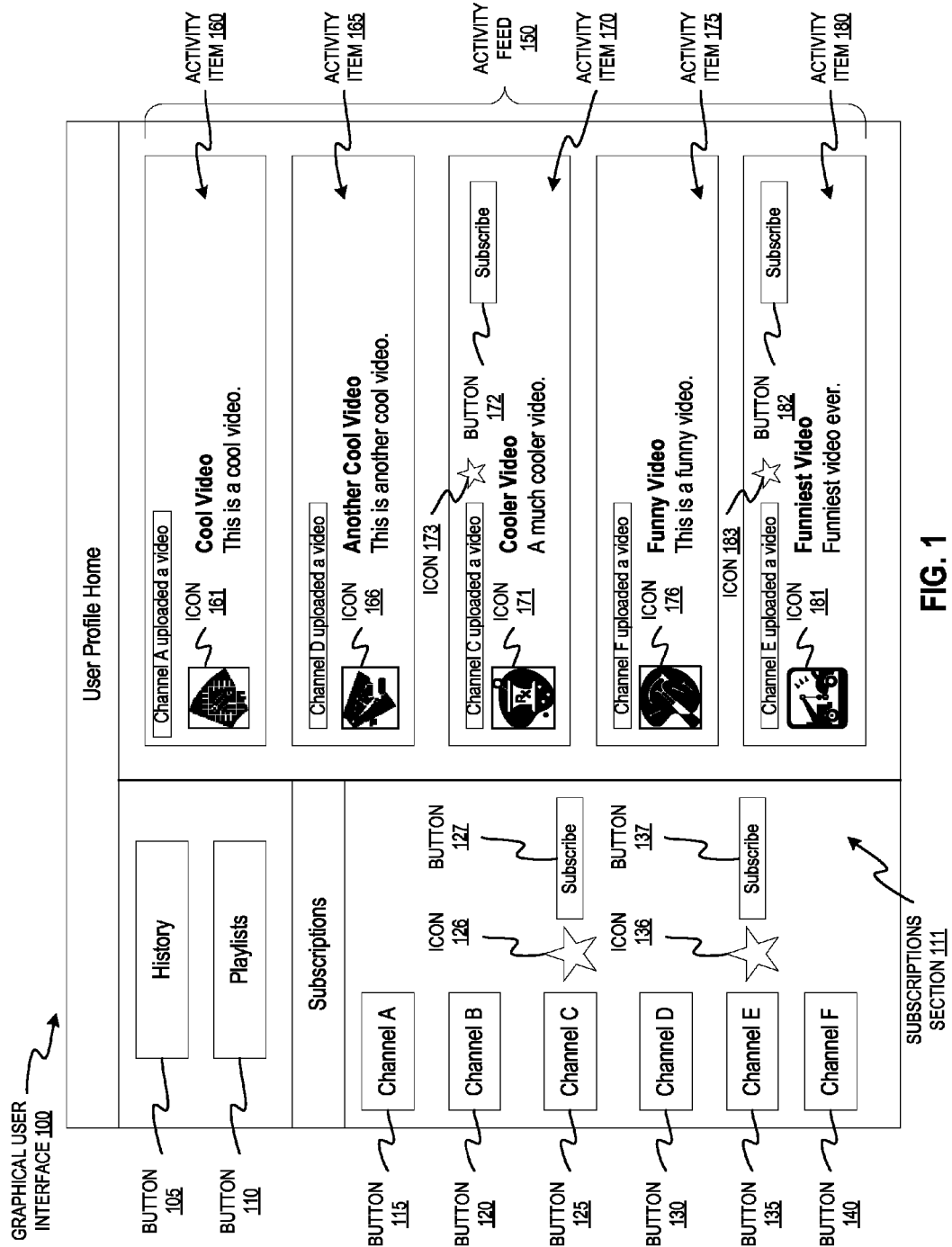
FIG. 1 is a diagram illustrating an example graphical user interface (GUI) in accordance with one embodiment of the present disclosure.

The following disclosure sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely examples. Particular implementations may vary from these example details and still be contemplated to be within the scope of the present disclosure.

Embodiments of the disclosure pertain to subscribing users to channels on the web. A channel can be data content available from a common source or data content having a common topic or theme. The data content can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel (e.g., a list of actions, such as adding a new media item, associated with each channel). Users, other than the owner of the channel, can subscribe to one or more channels in which they are interested. Once a user subscribes to a channel, the user can be presented with information from the channel's activity feed. If a user subscribes to multiple channels, the activity feed for each channel to which the user is subscribed can be combined into a combined activity feed. Information from the combined activity feed can be presented to the user. The combined activity feed may include a list of activities (e.g., adding new media items, comments, likes, etc.) that are associated with a plurality of different channels that the user is subscribed to.

Because of the large number of media items and channels that are currently available on the Internet (e.g., the Web and/or other networks), users may often have difficulty finding new media items to consume. In addition, users may be reluctant to subscribe to a channel even though they may be interested in media items in the channel because they may find it cumbersome to subscribe to multiple channels. Embodiments of the present disclosure may identify one or more recommended channels for a user. The user may be temporarily subscribed to the recommended channels and media items from the recommended channels may be presented to the user. If the user views a number of media items from a recommended channel, requests to subscribe to the recommended channel, and/or indicates approval of ("likes") a media item from the recommended channel, the user may be automatically subscribed to the recommended channel. If the user does not view media items from a recommended channel after a period of time, requests to unsubscribe to the recommended channel, and/or does not view media items from a recommended channel after being presented with a certain number of media items from the recommended channel, the user may be automatically unsubscribed to the recommended channel. In one embodiment, temporarily subscribing, fully subscribing (e.g., changing from a temporary subscription to a normal subscription), and/or unsubscribing the user from recommended channels may allow the user to more easily find new media items to consume.

FIG. 1 is a diagram illustrating an example graphical user interface (GUI) 100 in accordance with one embodiment of the present disclosure. In one embodiment, the GUI 100 may be a homepage of a user of a content sharing platform. For example, the GUI 100 may be presented by and/or displayed within a web browser when the user accesses the content sharing platform via the web browser. In another embodiment, the GUI 100 may be a home interface or a main interface presented by a media viewer (e.g., an app, an application, a program, a software module/component, etc., that may be used to view, play, and/or consume media items). Although the GUI 100 is illustrated using buttons (e.g., buttons 105, 110, 115, etc.), other embodiments may use links and/or other graphical user interface controls or elements in place of one or more of the buttons.

The GUI 100 includes buttons 105 and 110. Button 105 may allow the user to view a history of the media items that the user has consumed (e.g., viewed or played). For example, when the user selects and/or activates the button 105, a new GUI that includes a list of the last (e.g., ten, twenty, fifty or hundred) media items viewed by the user may be presented to the user. The button 110 may allow a user to view different playlists of media items that the user has previously created and/or obtained. A playlist may be a list and/or an order of different media items that can be viewed in sequential or shuffled order without interaction from the user. A media viewer (e.g., a media viewer application and/or a web browser) may play the media items on a playlist in the order in which the media items are listed on the playlist. A user may also transition between media items on a play list. For example, a user may play the next media item on the playlist or may select a particular media item in the playlist.

The GUI also includes a subscriptions section 111 that includes a list of one or more channels that the user is currently subscribed to. In one embodiment, the subscriptions section 111 may include a list of all channels to which the user is subscribed to. In another embodiment, the subscriptions section 111 may include a subset of channels to which the user is subscribed to. For example, the "Subscriptions" section may present a predefined number of channels (e.g., 5 channels), the channels that the user accesses most frequently, the channels that the user has accessed most recently, the channels that the user has most recently subscribed to, etc. Other embodiments of determining the channels to include in a subset of channels displayed can be used without departing from the scope of the disclosure. As illustrated in FIG. 1, the subscriptions section 111 includes buttons 115, 120, 125, 130, 135, 140 and 140. Button 115 is labeled "Channel A" to indicate that that user is subscribed to Channel A, button 120 is labeled "Channel B" to indicate that that user is subscribed to Channel B, button 125 is labeled "Channel C" to indicate that that user is subscribed to Channel C, button 130 is labeled "Channel D" to indicate that that user is subscribed to Channel D, button 135 is labeled "Channel E" to indicate that that user is subscribed to Channel E, and button 140 is labeled "Channel F" to indicate that that user is subscribed to Channel F. In one embodiment, a list of media items in a channel may be presented to the user when the user activates a corresponding button for the channel. For example, if the user activates (e.g., clicks on or selects) button 135, the GUI 100 may display a list of videos that are in Channel E. In one embodiment, when a user activates (e.g., clicks, selects, etc.) one of the buttons 115 through 140, a menu may appear on the GUI 100 listing media items associated with the channel associated with the activated button. In another embodiment, when a user activates (e.g., clicks, selects, etc.) one of the buttons 115 through 140, a popup window including a graphic representation (e.g., picture of a single frame from the media item) of media items in the channel associated with the activated button may appear on the GUI 100. It should be understood that in other embodiments, other visual indicators such as graphic representations, and/or text can be presented to a user to provide channels to the user.

As illustrated in FIG. 1, icon 126 (e.g., a indicator) is located next to button 125 (e.g., channel C) and icon 136 (e.g., an indicator) is located next to button 135 (channel E). In one embodiment, icon 126 may indicate that the user has been temporarily subscribed to channel C and icon 136 may indicate that the user has been temporarily subscribed to channel E. The content sharing platform may identify channels (e.g., channel C and channel E) that include media items which may be of interest to the user. The content sharing platform may temporarily subscribe the user to these channels (e.g., recommended channels) in order to provide the user with new media items (e.g., new content) to consume and/or provide the user with access to media items. For example, media items from the recommended channels may be displayed on the activity feed 150, as discussed further below. In one embodiment, the content sharing platform may identify recommended channels for the user based on interactions that the user has with other users of the content sharing platform and/or other platforms. For example, the content sharing platform may identify other users that communicate with the user (e.g., other users that the user emails, other users that the user chats with, other users that the user communicates messages with using a social connection platform, etc.). The content sharing platform may identify channels that belong to the other users and/or channels that the other users may be subscribed to. The content sharing platform may temporarily subscribe the user to these channels (e.g., recommended channels). In another example, the content sharing platform may also analyze the interactions (e.g., analyze the emails, chats, messages, and/or posts) to identify channels that may include media items that are of interest to the user. In another embodiment, the content sharing platform may temporarily subscribe a user to channels based on user input provided by the user. For example, the user may voluntarily provide input indicating the user's interests, preferences, likes, dislikes, hobbies, employment, geographical location, personal information, and/or other demographic information. The content sharing platform may identify recommended channels that include media items that may be of interest to the user based on the personal information and/or other demographic information voluntarily provided by the user.

The content sharing platform may collect demographic information pertaining to groups of users (e.g., age of user groups, geography (e.g., country, state, city) of user groups) and may store the information in one or more data stores (e.g., hard disks, memories, databases, etc.). In situations in which the embodiments discussed herein collect personal information and/or demographic about users, or may make use of personal information and/or demographic information, the user may be provided with an opportunity to control whether programs or features collect entity information (e.g., information about a user's social network, social actions or activities, profession, a user's preferences, or a user's current location), or to control whether and/or how to receive content from the content sharing platform that may be more relevant to the user. In addition, certain data may be treated in one or more ways before it is stored or used, so that personally identifiable information is removed. For example, an user's identity may be treated so that no personally identifiable information can be determined for the user, or an user's geographic location may be generalized where location information is obtained (such as to a city, ZIP code, or state level), so that a particular location of a user cannot be determined. Thus, the user may have control over how information is collected about the user and used by the content sharing platform.

In one embodiment, the user may be unsubscribed from a recommended channel (e.g., channel E) if the user does not view media items from the recommended channel after being presented with a threshold number of media items from the recommended channel (e.g., after a threshold number of media items are listed in an activity feed). For example, the user may be unsubscribed from channel E if the user is presented with five or more media items from channel E (if five impressions of media items from the channel E occur) and the user does not consume (e.g., view, watch, play, etc.) any media items from channel E. It should be understood that in other embodiments, the threshold number of media items may be any number of media items (e.g., 5, 10, 20, 50, etc.). In another embodiment, the user may be unsubscribed from a recommended channel (e.g., channel C) if the user does not view media items from the recommended channel for a threshold period of time. For example, the user may be unsubscribed from the channel C if the user does not view any media items from channel C for a week. It should be understood that in other embodiments, the threshold period of time may be any period of time (e.g., minutes, hours, days, months, years, etc.). In a further embodiment, the user may be unsubscribed from a recommended channel if the user provides user input indicating that the user wants to unsubscribe from the recommended channel. For example, the user may activate an "Unsubscribe" button in a GUI of the media view.

Figure 2:
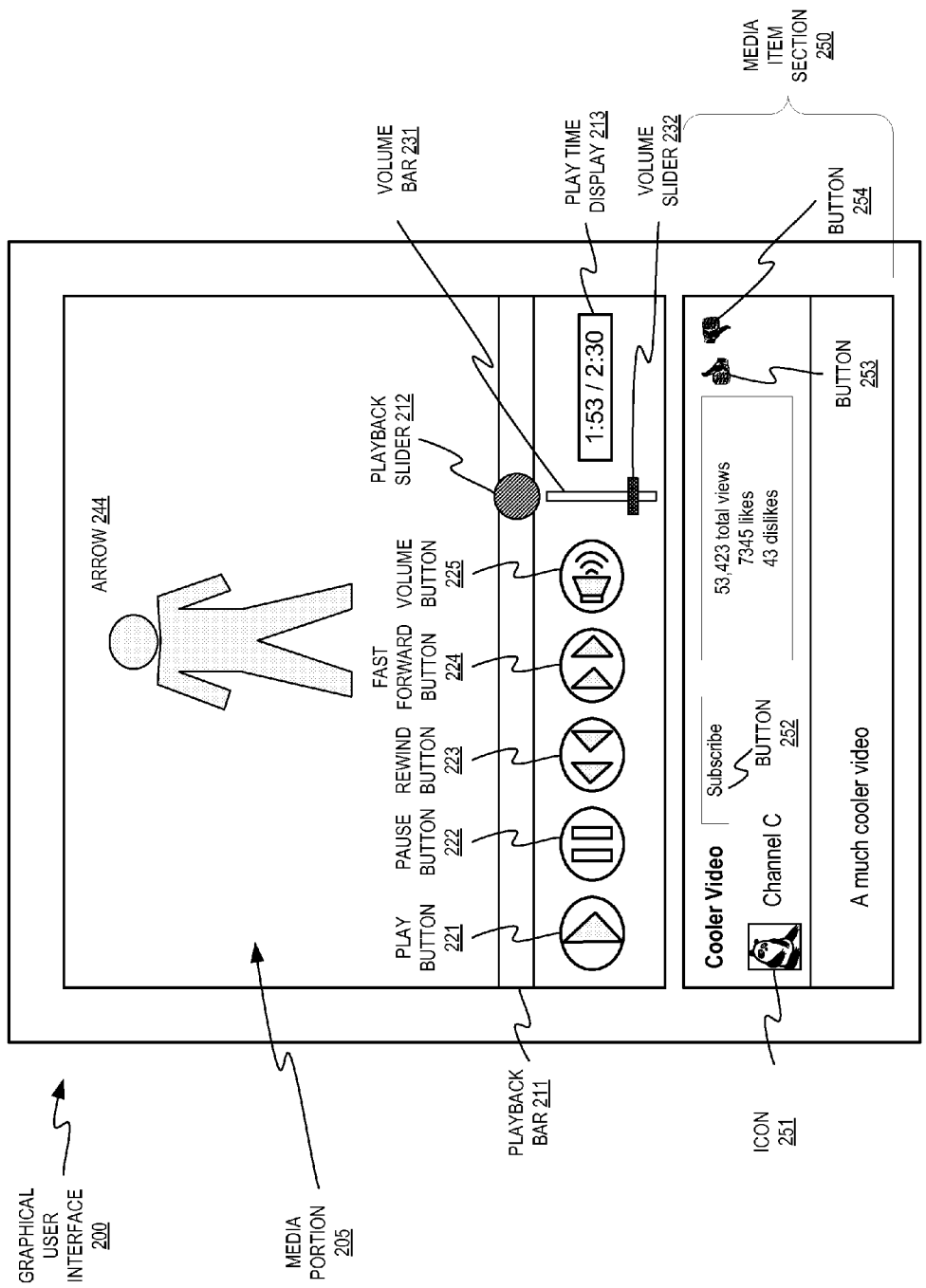
FIG. 2 is a diagram illustrating an example graphical user interface (GUI) in accordance with another embodiment of the present disclosure.

In one embodiment, the user may be fully subscribed to a recommended channel when the user consumes (e.g., views, watches, plays, etc.) a threshold number of media items from the recommended channel. For example, the temporary subscription to channel E may be changed to a normal subscription (e.g., a subscription where the user is not unsubscribed from a channel if the user does not view media items from the channel) if the user views three or more media items from the channel E. It should be understood that in other embodiments, the threshold number of media items may be any number of media items (e.g., 5, 10, 20, 50, etc.). In another embodiment, the user may be fully subscribed to a recommended channel if the user provides user input indicating that the user likes a media item in the recommended channels. For example, the user may "like" the media item by clicking on a button (as illustrated in FIG. 2). In a further embodiment, the user may be fully subscribed to a recommended channel (e.g., the temporary subscription may be changed to a normal subscription) if the user provides user input indicating that the user wants to full subscribe to the recommended channel. For example, the user may be fully subscribed to channel C if the user activates (e.g., clicks or selects) the button 127 and/or the user may be fully subscribed to channel E if the user activates (e.g., clicks or selects) the button 137. The icons 126 and/or 136 may no longer be displayed in the subscription section 111 when the user fully subscribes to channel C and/or channel E (e.g., when the temporary subscription to channel C and/or channel E is changed into a normal subscription). For example, after the user fully subscribes to channel F, the icon 126 may no longer be displayed. In a further embodiment, the user may be fully subscribed to a recommended channel if the user provides user input indicating that the user wants to subscribe to the channel. For example, the user may activate the subscribe button 127 to subscribe to channel C.

In one embodiment, a normal subscription to a channel may be a subscription where the user will not be unsubscribed even though the user has not viewed media items from the channel for a threshold period of time and/or even though the user has been presented with a threshold number of media items from the channel but has not viewed media items from the channel. In another embodiment, a normal subscription to a channel may be a subscription where the user can be unsubscribed from the channel if the user provides user input indicating that the user wants to unsubscribe from the channel. Changing from a temporary subscription to a channel to a full subscription to the channel may also be referred to as "fully subscribing" to the channel.

The activity feed 150 can include information about activities associated with channels to which the user is subscribed. In one embodiment, the activity feed 150 can include information about the most recent activities (e.g., activity items) associated with each channel (e.g., media items uploaded to the channel, etc.), as well as a mechanism for the user to perform an action for that activity (e.g., providing a frame, image, and/or icon of the digital content uploaded to the channel that serves as a link to the digital content). If the user uses the activity feed 150 to perform an action, that action can be associated with the channel which performed the activity. In one embodiment, the activity feed 150 may be a combined activity feed that includes activities associated with multiple channels that the user is subscribed to.

As illustrated in FIG. 1, the activity feed 150 includes activity items 160, 165, 170, 175, and 180. Each media item may include information about the activity, the title of a media item, a description of the media item, and an icon for the media item. For example, the activity item 160 includes information that "Channel A uploaded a video," includes the title of the video (e.g., Cool Video), a description of the video (e.g., "This is a cool video"), and an icon 161. An icon (e.g., icon 166 or icon 126) may be text, a thumbnail, an image, a frame, and/or some other graphic used to represent the media item for the activity item 160. Icons 166, 171, 176, and 181 are used to represent the media items (e.g., videos) associated with activity items 165, 170, 175, and 180 respectively. Activity items 170 and 180 are activities associated with channels that the user is temporarily subscribed to (e.g., recommended channels, such as channel C and channel E). For example, activity item 170 indicates that the video titled "Cooler Video" was uploaded to channel C. The activity items 170 and 180 also include buttons 172 and 182. The buttons 172 and 182 may allow a user to fully subscribe (e.g., change to a normal subscription) to the recommended channels associated with the activity items 170 and 180. For example, the user may fully subscribe to channel C by clicking on button 172. The activity items 170 and 180 also include icons 173 and 183 (e.g., visual indicators), respectively. The icons 173 and 183 (e.g., visual indicators) may indicate (e.g., denote) to the user that the media items associated with the activity items 170 and 180 are from recommended channels (e.g., are from channel C and channel E). Although a list of videos are shown as being included in the activity feed 150, it should be understood that in other embodiments, other activity feed information may be shown in the GUI 100. For example, an image (e.g., a JPEG) may be shown in the GUI 100. In another example, digital music (e.g., an MP3) may be played in the GUI 100. In yet another example, social media information (e.g., a tweet, a like, etc.) may be shown in the GUI 100. In one embodiment, when a user is unsubscribed from a recommended channel, media items from the recommended channel may be removed from the activity feed of the user. For example, when a user is unsubscribed from channel C, activity item 170 may be removed from the activity feed 150.

FIG. 2 is a diagram illustrating an example graphical user interface (GUI) 200 in accordance with one embodiment of the present disclosure. In one embodiment, the GUI 200 may be part of a media viewer provided by a server (e.g., server 330 as illustrated and discussed below in conjunction with FIG. 3). For example, the GUI 200 may be part of a media viewer that is embedded in a web page (e.g., an embedded media viewer such as a Flash® player or a hypertext markup language-5 (HTML5) player) and the GUI 200 may be rendered by a web browser executing on a client device. In another embodiment, the GUI 200 may be part of a media viewer that may be separate from a web page/web browser (e.g., may be a standalone media viewer and/or application). For example, the media viewer may be a separate application that is executing on the client device. Referring back to FIG. 1, the GUI 200 may be displayed to the user when the user selects activity item 170 from the activity feed 150 (e.g., when the user selects the video titled "Cooler Video" that was uploaded by channel C).

The GUI 200 includes media viewer controls which may be used to control the consumption of the media items (e.g., digital videos and/or digital music). The media viewer controls include a play button 221, a pause button 222, a rewind button 223, a fast forward button 224, and a volume button 225. The play button 221 may allow a user to begin and/or restart playback of the media items. The pause button may allow a user to pause and/or un-pause playback of the media items. The rewind button 223 may allow a user to rewind playback, move and/or skip to an earlier point in time in the media items. The fast forward button 224 may allow a user to fast forward playback, move, and/or skip to a later point in time in the media items. The GUI 200 also includes a play time display 213, a playback bar 211 and a playback slider 212. The play time display 213 may display a current play time and/or a total play time for the media items. For example, a total play time (e.g., the total length) of media item may be 2 minutes and 30 seconds (e.g., 2:30). The current play time may be current time/position in the playback of media item (e.g., 1 minute and 53 seconds or 1:53). Playback slider 212 is positioned on a region of a playback bar 211 that corresponds to the current play time (e.g., 1:53). The playback slider 212 may be adjusted (e.g., dragged) to any other region of the playback bar 211 to adjust the current play time shown in the play time display 213. The GUI 200 includes a media portion 205 that may display a media items. For example, media portion 205 may be the portion of the GUI 200 where a video (e.g., a media item) is played. The media portion 205 may also play other types of videos, images, music, and/or other media items.

The volume button 225 may allow user to control the volume of sounds, music, and/or other audible noises in the videos. In one embodiment, the volume bar 231 and the volume slider 232 may be displayed when the user clicks and/or activates the volume button 225. For example, the volume bar 231 and the volume slider 232 may not be initially displayed in the GUI 200. After the user clicks the volume button 225, the volume bar 231 and the volume slider 232 may be displayed. The user may move and/or slide the volume slider 232 up and/or down along the volume bar 231 to control the volume of sounds, music, and/or other audible noises in the videos. For example, the user may slide the volume slider 232 up to increase the volume or may slide volume slider 232 down to decrease the volume. In one embodiment (not shown in the figures), the GUI 200 may also include buttons (e.g., magnifying glass buttons) that allow a user to zoom in and/or zoom out during the playback of the videos. This may allow a user to get a closer view and/or a farther view of the media item.

The GUI 200 also includes media item section 250. The media item section 250 may include information such as the title, a description, number of approvals from other users (e.g. "likes"), number of dislikes, the channel that the media item belongs to, and total number of views for the media item. Referring back to FIG. 1, the media item section 250 includes information about the video titled "Cooler Video" such as the title, the description (e.g., "A much cooler video"), the channel that the video belongs to (e.g., Channel C), and the number of views (e.g., 53,423), likes (e.g., 7345), and dislikes (e.g., 43) for the video. The media item section 250 also includes an icon 251 that may be used to represent the channel C.

The media item section 250 further includes buttons 252, 253, and 254. Button 252 may allow a user to fully subscribe (e.g., change to a normal subscription) to the channel that includes the media item presented in the media portion 205. For example, the button 252 may be used to subscribe to the channel C that includes the video titled "Cooler Video" that is playing in the media portion 205. The button 253 may allow a user to indicate that the user approves of or likes the media item that is playing in the media portion 205. For example, the button 253 may be used to approve of or "like" the video titled "Cooler Video" that is playing in the media portion 205. As discussed above, the user may be fully subscribed to a recommended channel when the user likes a media item from the channel. For example, the user may be fully subscribed to channel C if the user likes (e.g., activates the button 253) video titled "Cooler Video" that is playing in the media portion 205. The button 254 may allow a user to indicate that the user does not like the media item that is playing in the media portion 205. For example, the button 254 may be used "dislike" the video titled "Cooler Video" that is playing in the media portion 205.

Figure 3:
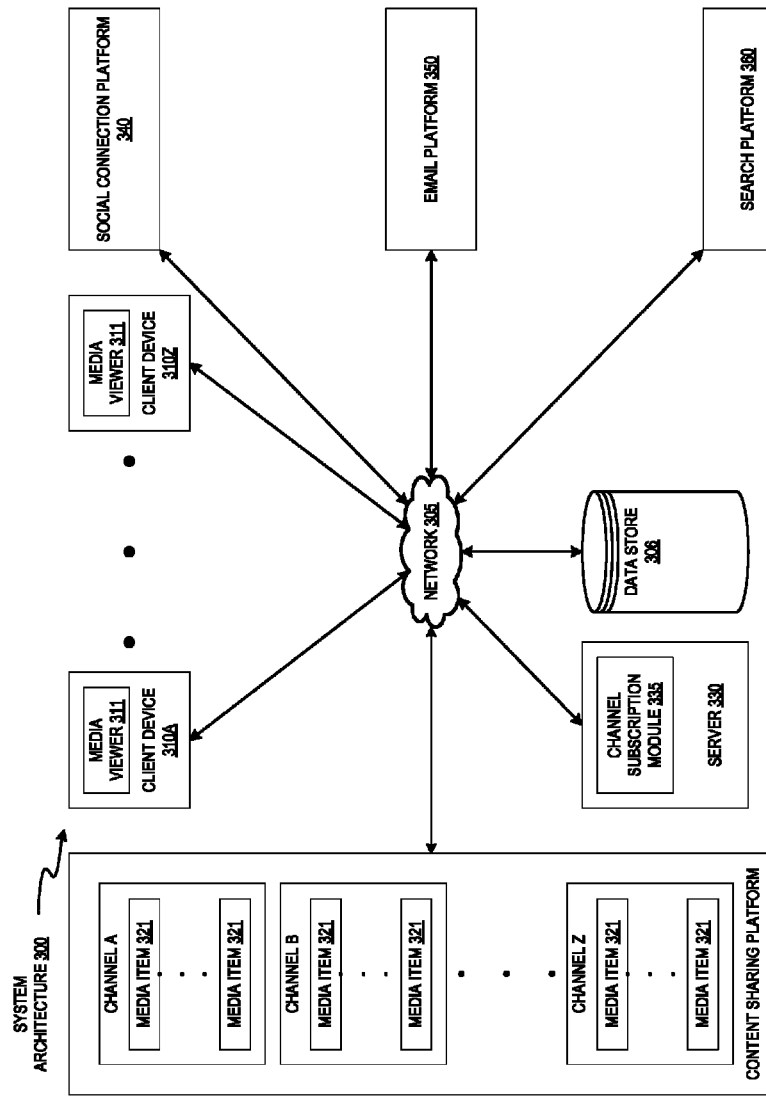
FIG. 3 illustrates an example system architecture, in accordance with one embodiment of the present disclosure.

FIG. 3 illustrates an example system architecture 300, in accordance with one embodiment of the present disclosure. The system architecture 300 includes client devices 310A through 310Z, a network 305, a data store 306, a content sharing platform 320, a server 330, a social connection platform 340, an email platform 350, and a search platform 360. In one embodiment, network 305 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one embodiment, the data store 310 may be may be a memory (e.g., random access memory), a cache, a drive (e.g., a hard drive), a flash drive, a database system, or another type of component or device capable of storing data. The data store 310 may also include multiple storage components (e.g., multiple drives or multiple databases) that may also span multiple computing devices (e.g., multiple server computers).

The client devices 310A through 310Z may each include computing devices such as personal computers (PCs), laptops, mobile phones, smart phones, tablet computers, netbook computers etc. Each client device includes a media viewer 311. In one embodiment, the media viewers 311 may be applications that allow users to view content, such as images, videos, web pages, documents, etc. For example, the media viewer 311 may be a web browser that can access, retrieve, present, and/or navigate content (e.g., web pages such as Hyper Text Markup Language (HTML) pages, digital media items, etc.) served by a web server. The media viewer 311 may render, display, and/or present the content (e.g., a web page, a media viewer) to a user. The media viewer 311 may also display an embedded media player (e.g., a Flash® player or an HTML5 player) that is embedded in a web page (e.g., a web page that may provide information about a product sold by an online merchant). In another example, the media viewers 311 may be a standalone application that allows users to view digital media items (e.g., digital videos, digital images, electronic books, etc.). The media viewers 311 may be provided to the client devices 310A through 310Z by the server 330 and/or content sharing platform 320. For example, the media viewers 311 may be embedded media players that are embedded in web pages provided by the content sharing platform 320. In another example, the media viewers 311 may be applications that are downloaded from the server 330.

In one embodiment, the content sharing platform 320 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. For example, the content sharing platform 320 may allow a user to consumer, upload, search for, approve of ("like"), dislike, and/or comment on media items. The content sharing platform 320 may also include a website (e.g., a webpage) that may be used to provide a user with access to the media items. The content sharing platform 320 includes multiple channels (e.g., channels A through Z). Each channel may include one or more media items 321. Examples of a media item can include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc. A media item may be consumed via the Internet and/or via a mobile device application. For brevity and simplicity, an online video (also hereinafter referred to as a video) is used as an example of a media item throughout this document. As used herein, "media," media item," "online media item," "digital media," and a "digital media item" can include an electronic file that can be executed or loaded using software, firmware or hardware configured to present the digital media item to an entity. In one embodiment, the content sharing platform 320 may store the media items using the data store 306.

Social connection platform 340 may be one or more computing devices (e.g., servers), data stores, networks, software components, and/or hardware components that may be used to allow users to connect to, share information, and/or interact with each other. A social connection platform 340 may present to a user a listing (e.g., activity feed, feed, stream, wall, etc.) of objects (such as posts, content items (e.g., video, images, audio, etc.), status updates, favorability indications, tags, messages, and so on) generated by other users of the social network. The social connection platform 340 may also include a content sharing aspect that allow users to upload, view, tag, and share content, such as text content, video content, image content, audio content, and so on. Other users of the social connection platform 340 may comment on the shared content, discover new content, locate updates, share content, and otherwise interact with the provided content. In one embodiment, the content sharing platform 320 may be integrated with the social connection platform 340. For example, the social connection platform 340 may use the content sharing platform 320 to allow users to upload and/or share content. In another embodiment, the social connection platform 340 may be separate from the content sharing platform 320. In one embodiment, the social connection platform 340 may also include chat functionality (e.g., a chat platform) to allow users to chat (e.g., to instant message) each other.

In one embodiment, email platform 350 may be one or more computing devices (e.g., servers), data stores, networks, software components, and/or hardware components that may be used to allow users to send and/or receive electronic-mail (emails) to each other. For example, a first user may use the email platform 350 to send an email to a second user regarding the time and location of a particular event. The first user may also attached files (e.g., video files, image files, text files, etc.) to the email. In one embodiment, the email platform 350 may also include chat functionality (e.g., a chat platform) to allow users to chat (e.g., to instant message) each other. In another embodiment, the search platform 360 may be one or more computing devices, data stores, networks, software components, and/or hardware components that may be used to allow users to search for information and/or data. For example, the search platform 360 may allow a user to search the Internet and/or other networks for articles, blogs, websites, webpages, images, videos, and/or other content related to a particular topic (e.g., how to fix a car). The search platform 360 may also include a search engine.

In one embodiment, the server 330 may be one or more computing devices (e.g., a rackmount server, a server computer, etc. In one embodiment, the server 330 may be included in one or more of the content sharing platform 320, the social connection platform 340, the email platform 350, and the search platform 360. In another embodiment, the server 330 may be separate from the content sharing platform 320, the social connection platform 340, the email platform 350, and the search platform 360 but may communicate (e.g., exchange data with) the content sharing platform 320, the social connection platform 340, the email platform 350, and the search platform 360. The server 330 includes a channel subscription module 335. The channel subscription module 335 may temporarily subscribe a user of the content sharing platform 320 to one or more channels of the content sharing platform 320. This may allow the user to more easily find new channels and/or media items to consume (e.g., to view).

In one embodiment, the channel subscription module 335 may identify channels for temporary subscriptions for the user by analyzing interactions between the user and other users of one or more of the content sharing platform 320, the social connection platform 340, the email platform 350, and the search platform 360. For example, the channel subscription module 335 may obtain (e.g., may determine or calculate) an affinity score between two users. In one embodiment, an affinity score is an indication of a level of connection between two users of the different platforms (e.g., the content sharing platform 320, the social connection platform 340, and the email platform 350). For example, an affinity score may be calculated by looking at explicit actions that users take (e.g., clicking, liking (providing a positive feedback), commenting, tagging (e.g., assigning an identifier to a piece of information), sharing, friending (requesting to be a friend), etc.), and factoring in the strength of the action, how "connected" the user who took the action was to the target user (e.g., how many mutual connections they share, etc.), and how long ago they took the action. In addition, other factors such as mode of communication, frequency of communications, and so on, may be taken into consideration for determining an affinity score. Note that an affinity score may be a one-way score (e.g., not reciprocal). In other words, a first user's affinity score for a second user is not necessarily the same as the second user's affinity score for the first user. The affinity score may be any number, text, and/or value that may be used to indicate the level of connection between two users. For example, the affinity score may be a numerical value from 0 to 1 (e.g., 0.8) where a value of 0 indicates no connection between two users and a value of 1 indicates a very high level of connection between two users. In another example, the affinity score may be a numerical value from 1 to 10, or 1 to 100, where a higher number indicates a higher level of connection between two users.

The channel subscription module 335 may obtain affinity scores for a first user and multiple other users by analyzing interactions between a first user and the other users. The channel subscription module 335 may identify one or more users with which the first user has higher affinity scores (e.g., may identify which of the other users the first user interacts more with) and may identify channels for temporary subscription based on the one or more users. For example, the channel subscription module 335 may identify channels that belong to the one or more users. In another example, the channel subscription module 335 may identify channels that the one or more users are subscribed to and/or have accessed. The channel subscription module 335 may temporarily subscribe the first user to one or more of the identified channels.

The channel subscription module 335 may communicate with one or more of the content sharing platform 320, the social connection platform 340, the email platform 350, and the search platform 360 and may collect account information, personal information, and/or demographic information pertaining to groups of users (e.g., age of user groups, geography (e.g., country, state, city) of user groups) and may store the information in one or more data stores (e.g., hard disks, memories, databases, etc.). In situations in which the embodiments discussed herein collect personal information and/or demographic about users, or may make use of personal information and/or demographic information, the user may be provided with an opportunity to control whether the channel subscription module 335 is allowed collect the information (e.g., information about a user's social network, social actions or activities, profession, a user's preferences, or a user's current location), or to control whether and/or how to receive content from the content sharing platform that may be more relevant to the user. In addition, certain data may be treated in one or more ways before it is stored or used, so that personally identifiable information is removed. Thus, the user may have control over how, when, and what type of information is collected about the user and used by the channel subscription module 335.

In one embodiment, the channel subscription module 335 may identify channels for temporary subscription for a user by analyzing the content of the interactions between the user and other users. For example, the channel subscription module 335 may analyze the subject matter of user interactions such as emails, chat messages (e.g., instant messages), text messages, short message service (SMS) messages, multimedia message service (MMS) messages, posts on walls of the social connection platform 340, etc. The channel subscription module 335 may identify channels for temporary subscription based on the subject matter of the user inactions. For example, two users may exchange chat messages discussing a basketball game that recently occurred. The channel subscription module 335 may identify channels related to basketball, related to certain basketball teams, and/or related to a content provider (e.g., a sports channel on television) based on the chat messages. The channel subscription module 335 may use any combination of algorithms, functions, operations, actions, etc., to analyze user interactions and identify subject matter that may be of interest to different users.

In another embodiment, the channel subscription module 335 may group (e.g., cluster) different users of the content sharing platform 320 based on histories of or lists of media items that the different users have consumed. For example, the channel subscription module 335 may identify groups of users where each user in the group of users has consumed the same set of media items (e.g., each user in the group has viewed the same four, ten, twenty, etc. videos). The channel subscription module 335 may use a variety of algorithms, functions, and/or techniques to group (e.g., cluster) different users together. For example, the channel subscription module 335 may use clustering algorithms, including but not limited to, connectivity based clustering algorithm (e.g., hierarchical clustering), a centroid-based clustering algorithm, a distribution-based clustering algorithm, and/or a density-based clustering algorithm. The channel subscription module 335 may identify a first user and determine which groups (e.g., which clusters) a user is part of. The channel subscription module 335 may identify media items that other users in the identified groups have consumed, but that the first user has not consumed. For example, the channel subscription module 335 may identify a media item where a threshold number of other users (e.g., at least ten users, at least twenty users, more than 50% of the users, more than 75% of the users, etc.) in a first group have viewed the media item, but the first user in the group has not viewed the media item. The channel subscription module 335 may identify the channel that the media item belongs to and may temporarily subscribe the first user to the recommended channel.

In one embodiment, the channel subscription module 335 may analyze a list and/or a history of media items viewed by a first user to identify recommended channels for the first user. For example, the channel subscription module 335 may determine that a first user has viewed a certain number of videos from a channel (e.g., has viewed five, fifteen, etc., videos from a channel) but that the user is not subscribed to the channel. Because the user has viewed videos from this channel before, it may be likely that the user is interested in the content (e.g., media items) of the channel. The channel subscription module 335 may temporarily subscribe the first user to this channel (e.g., the recommended channel), based on the list and/or history of the media items (e.g., media items from the recommended channel) that the user has previously viewed.

In another embodiment, the channel subscription module 335 may temporarily subscribe a user to channels based on user input provided by the user. For example, the user may voluntarily provide input indicating the user's interests, likes, hobbies, employment, geographical location, personal information, and/or other demographic information. The channel subscription module 335 may identify recommended channels that include media items that may be of interest to the user based on the personal information and/or other demographic information voluntarily provided by the user. For example, a user may provide user input indicating that the user likes a certain comedy show on television when the user creates an account for the social connection platform 340. The channel subscription module 335 may identify channels related to comedy or a particular genre of comedy, based on the user input. In another example, a user may provide user input indicating that the user likes cooking when the user creates and account for the content sharing network 320. The channel subscription module 335 may identify channels related to cooking or a certain type of cuisine, based on the user input.

In one embodiment, the channel subscription module 335 may add media items from channels that the user is temporarily subscribed to, to an activity feed for the user (e.g., activity feed 150 illustrated in FIG. 1). The activity feed may allow the user to quickly determine when new media items (e.g., new content) have been added to channels that the user is subscribed. This allows the user to find new and/or interesting media items to consume (e.g., play or view) more easily. In one embodiment, the channel subscription module 335 may fully subscribe a user (e.g., change to a normal subscription) to a recommended channel (that the user was temporarily subscribed to) when the user consumes a threshold number of media items from the recommended channel. For example, a user may be temporarily subscribed to a home improvement channel. After the user watches five or more home improvement tutorial videos from the home improvement channel, the user may be fully subscribed to the home improvement channel. In another embodiment, the channel subscription module 335 may fully subscribe the user to a recommended channel when the user likes a media item from the recommended channel. For example, when the user is watching a video about cooking, the user may like the video (e.g., by activating button 253 illustrated in FIG. 2). The channel subscription module 335 may fully subscribe the user to the cooking channel that includes the video.

In one embodiment, channel subscription module 335 may unsubscribe users from a recommended channel after a threshold period of time has passed and the user has not consumed media items from the recommended channel. For example, the channel subscription module 335 may temporarily subscribe a user to a channel related to football based on the user's interactions with other users (e.g., based on email messages discussing football). The user may not like the football team illustrated in the media items in the channel and may not view videos from that channel. The channel subscription module 335 may unsubscribe the user from the channel after a threshold period of time has passed (e.g., two weeks, seven days, etc.).

In another embodiment, the channel subscription module 335 may unsubscribe users from a recommended channel after a threshold number of media items from the recommended channel have been presented to a user (e.g., after a threshold number of impressions of media items from the recommended channel have occurred) and the user has not consumed media items from the recommended channel. For example, the channel subscription module 335 may temporarily subscribe a user to a channel related to video games based on the user's interactions with other users (e.g., based on social network platform posts, such as wall posts, discussing video games). The user may not like the genre of video games illustrated in the media items in the channel and may not view videos from that channel. The channel subscription module 335 may unsubscribe the user from the channel after a threshold number of videos (e.g., 5, 10, 20, etc.) have been presented to the user via an activity feed (e.g., after a threshold number of impressions). In one embodiment, media items from the recommended channel may be removed from the activity feed of the user when a user is unsubscribed from a recommended channel.

Figure 4:
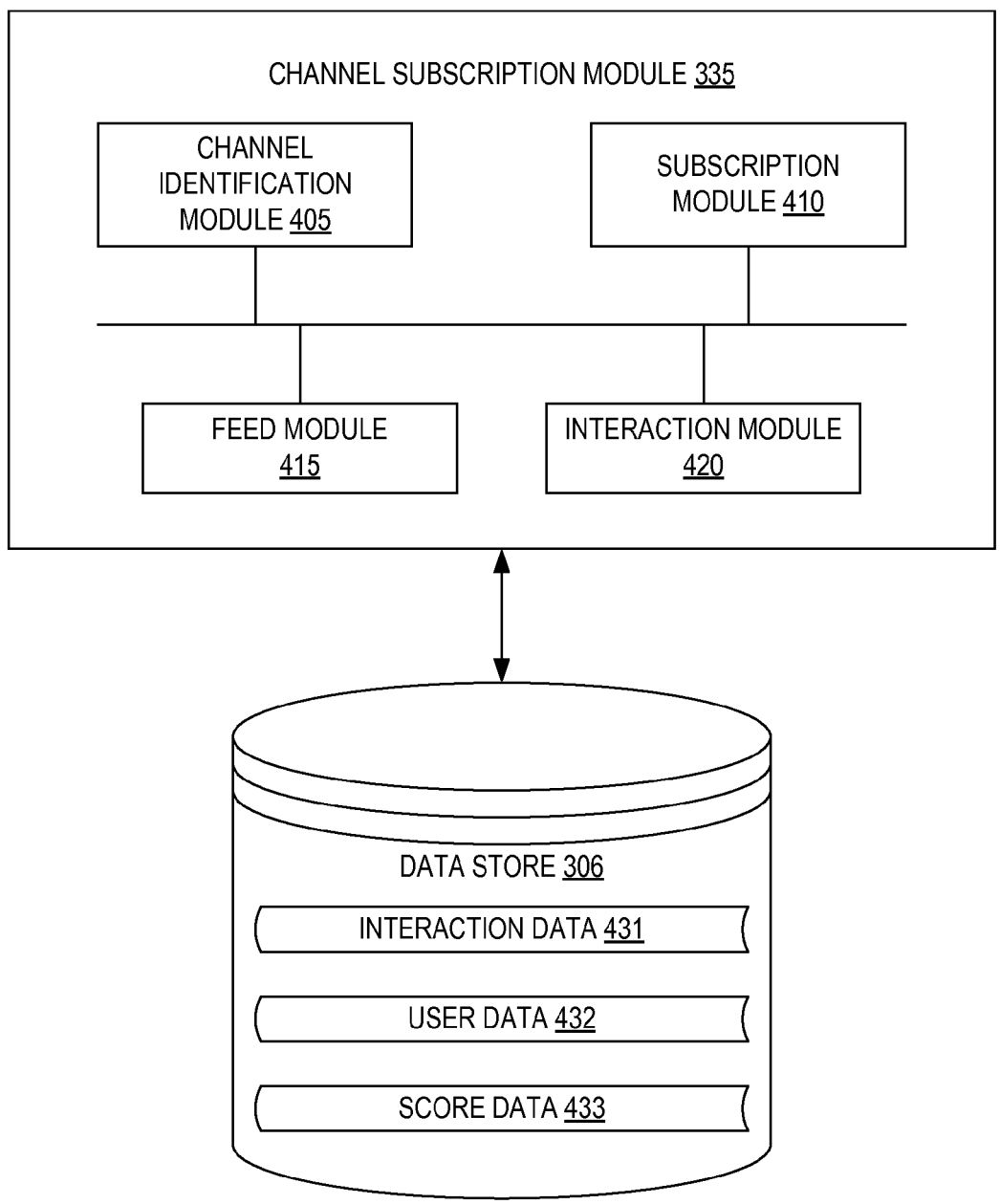
FIG. 4 is a block diagram illustrating a channel subscription module, in accordance with one embodiment of the present disclosure.

FIG. 4 is a block diagram illustrating a channel subscription module 335, in accordance with one embodiment of the present disclosure. The channel subscription module 335 includes a channel identification module 405, a subscription module 410, a feed module 415, and an interaction module 420. More or less components may be included in the channel subscription module 335 without loss of generality. For example, two of the modules may be combined into a single module, or one of the modules may be divided into two or more modules. In one embodiment, one or more of the modules may reside on different computing devices (e.g., different server computers).

The channel subscription module 335 is communicatively coupled to the data store 306. For example, the channel subscription module 335 may be coupled to the data store 306 via a network (e.g., via network 305 as illustrated in FIG. 3). In another example, the channel subscription module 335 may be coupled directly to a server where the channel subscription module 335 resides (e.g., may be directly coupled to server 330). The data store 306 may be a memory (e.g., random access memory), a cache, a drive (e.g., a hard drive), a flash drive, a database system, or another type of component or device capable of storing data. The data store 306 may also include multiple storage components (e.g., multiple drives or multiple databases) that may also span multiple computing devices (e.g., multiple server computers). The data store 306 includes interaction data 431, user data 432, and score data 433.

In one embodiment, the interaction module 420 may obtain (e.g., calculate and/or generate) affinity scores for different users. For example, the interaction module 420 may obtain (e.g., may determine or calculate) an affinity score between two users. The interaction module 420 may obtain the affinity score by looking at explicit actions that users take (e.g., clicking, liking, commenting, tagging, and factoring in the strength of the action, how "connected" the user who took the action was to the target user, and how long ago they took the action. In addition, other factors such as mode of communication, frequency of communications, and so on, may be taken into consideration for determining an affinity score. The interaction data 431 may include data, information, and/or records of interactions between users obtained from different platforms (e.g., a social connection platform, an email platform, a chat platform, etc.). For example, the interaction data 431 may include data such as emails, posts, chat messages, etc., between different users. The interaction module 420 may obtain the affinity scores bay analyzing the interaction data 431. In one embodiment, the interaction module 420 may store the affinity scores in the score data 433 of the data store 306.

In one embodiment, the channel identification module 405 may identify one or more channels for temporary subscriptions for a user. For example, the channel identification module 405 may identify other users with which a user has an affinity score over a certain threshold or may identify the users with which the user has the highest affinity scores (e.g., the top ten affinity scores). The channel identification module 405 may identify channels that belong to the user identified users, channels the identified users are subscribed to, and/or channels that are accessed by the identified users. The channel identification module 405 may temporarily subscribe the user to one or more of the identified channels. In another example, the channel identification module 405 may identify channels for temporary subscriptions for a user based on the content of a user's interactions with other users. The channel identification module 405 may identify channels based on the subject matter of emails and/or chat messages between different users, stored in the interaction data 431. In a further example, the channel identification module 405 may cluster or group users together to identify channels for temporary subscriptions, as discussed above in conjunction with FIG. 3. In yet another example, the channel identification module 405 may analyze history and/or list of media items viewed by a user to identify channels for temporary subscriptions, as discussed above in conjunction with FIG. 3.

In one embodiment, the channel identification module 405 may communicate with different platforms (e.g., a content sharing platform, a social connection platform, an email platform, etc.) and may collect account information, personal information, and/or demographic information pertaining to groups of users and may store the information in user data 432. The channel identification module 405 may identify channels for temporary subscription based on the user data 432, as discussed above in conjunction with FIG. 3. For example, the channel identification module 405 may identify recommended channels based on user data 432 which may indicate a user's interests, likes, hobbies, employment, geographical location, personal information, and/or other demographic information. In situations in which the embodiments discussed herein collect personal information and/or demographic about users, or may make use of personal information and/or demographic information, the user may be provided with an opportunity to control whether the channel subscription module 335 is allowed collect the information, or to control whether and/or how to receive content from the content sharing platform that may be more relevant to the user. In addition, certain data may be treated in one or more ways before it is stored or used, so that personally identifiable information is removed. Thus, the user may have control over how, when, and what type of information is collected about the user and used by the channel subscription module 335.

In one embodiment, the subscription module 410 may temporarily subscribe users to one or more recommended channels. The subscription module 410 may fully subscribe a user to a recommended channel (e.g., change to a normal subscription) if the user approves of ("likes") a media item in the recommended channel (as discussed above in conjunction with FIGS. 1-3). The subscription module 410 may also fully subscribe a user to a recommended channel if the user views a threshold number of media items from the recommended channel (as discussed above in conjunction with FIGS. 1-3). In another embodiment, the subscription module 410 may unsubscribe users from a recommended channel. For example, the subscription module 410 may unsubscribe users from a recommended channel after a threshold period of time has passed and the user has not consumed media items from the recommended channel (as discussed above in conjunction with FIGS. 1-3). In another example, the subscription module 410 may unsubscribe users from a recommended channel after a threshold number of media items from the recommended channel have been presented to a user and the user has not consumed media items from the recommended channel (as discussed above in conjunction with FIGS. 1-3). In one embodiment, the subscription module 410 may subscribe a user to a recommended channel if user input indicating a request to subscribe to the recommended channel is received. In another embodiment, the subscription module 410 may unsubscribe a user from a recommended channel if user input indicating a request to unsubscribe from the recommended channel is received.

In one embodiment, the feed module 415 may add media items from channels (that the user is temporarily subscribed to and/or fully subscribed to) to an activity feed (e.g., may generate an activity feed) for the user (e.g., activity feed 150 illustrated in FIG. 1). In another embodiment, the feed module 415 may remove media items from the activity feed after a user is unsubscribed from the activity feed. For example, after a user is unsubscribed from a channel, the feed module 415 may remove all media items from the channel, from the activity feed of the user.

Figure 5:
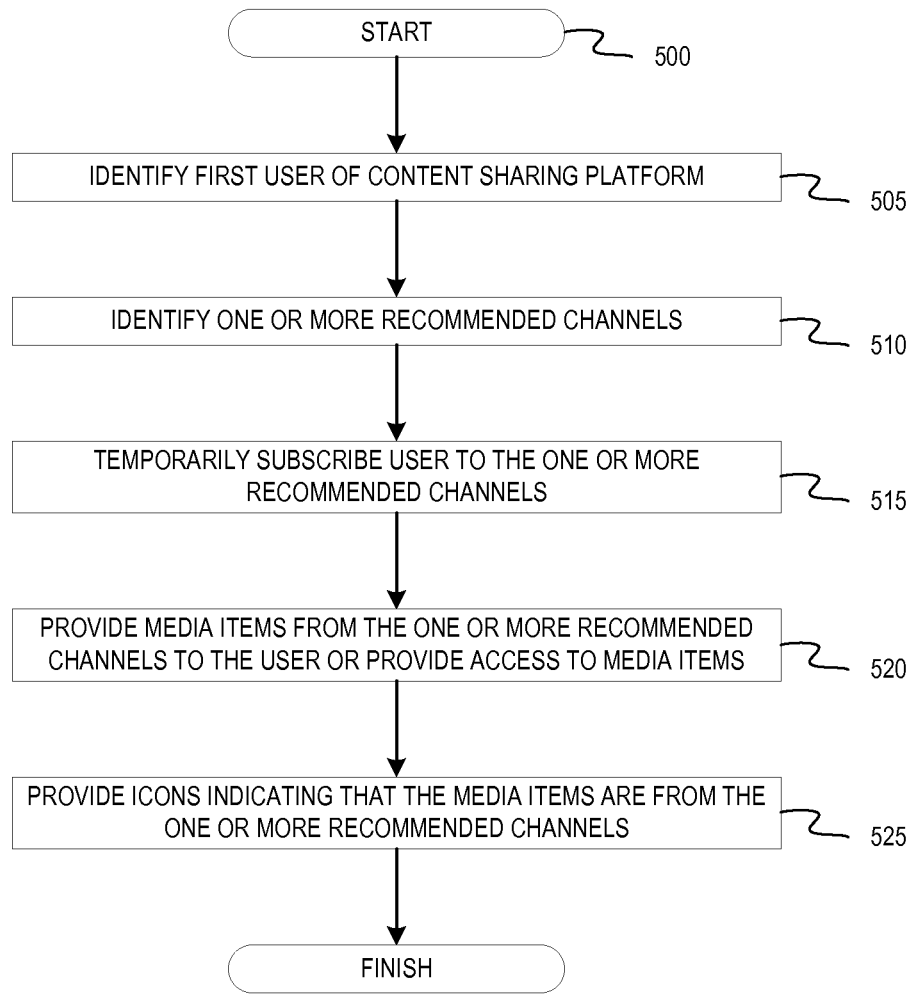
FIG. 5 is a flow diagram illustrating a method of subscribing to a channel, in accordance with one embodiment of the present disclosure.
Figure 6:
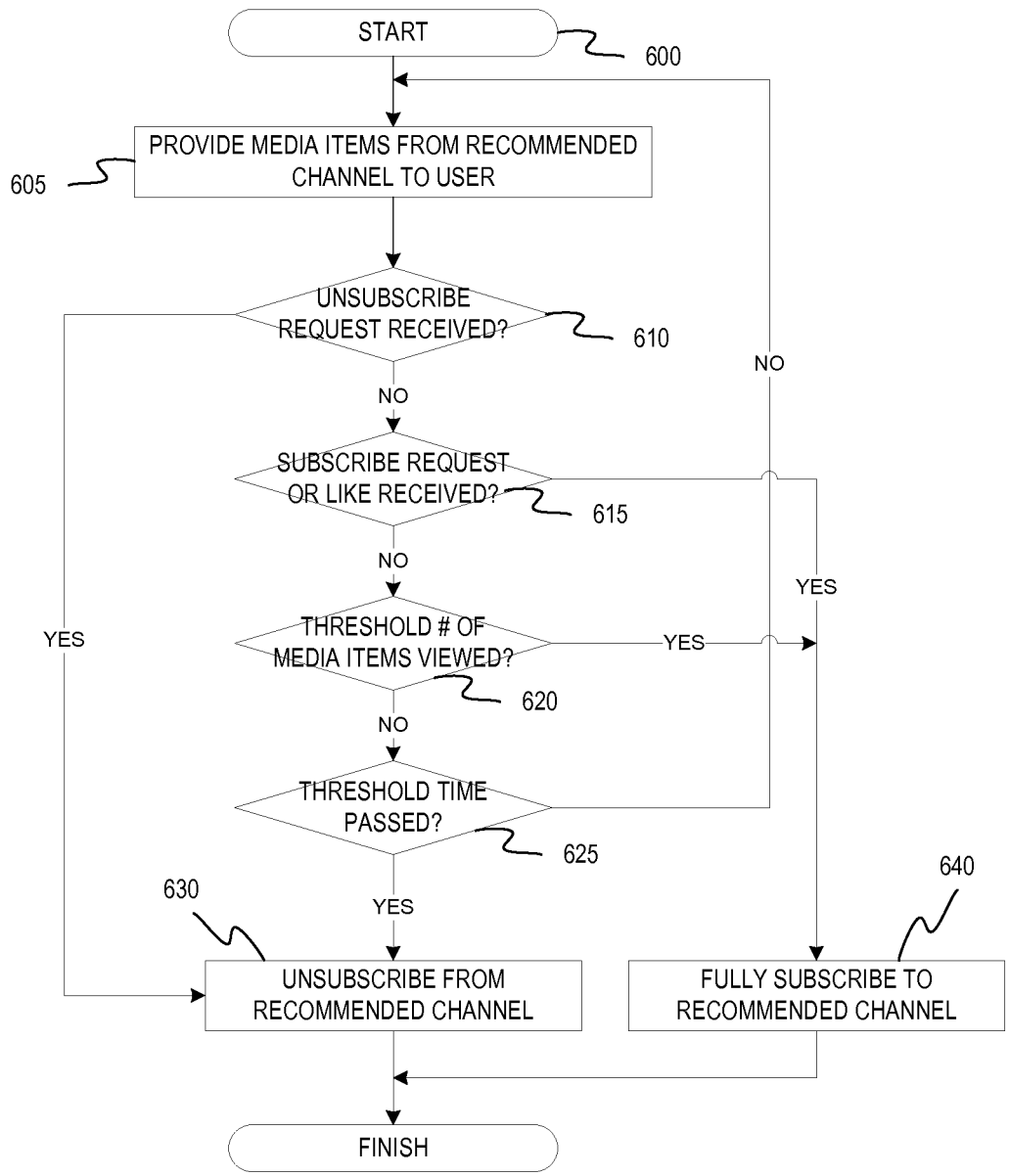
FIG. 6 is a flow diagram illustrating a method of subscribing to a channel, in accordance with another embodiment of the present disclosure.
Figure 7:
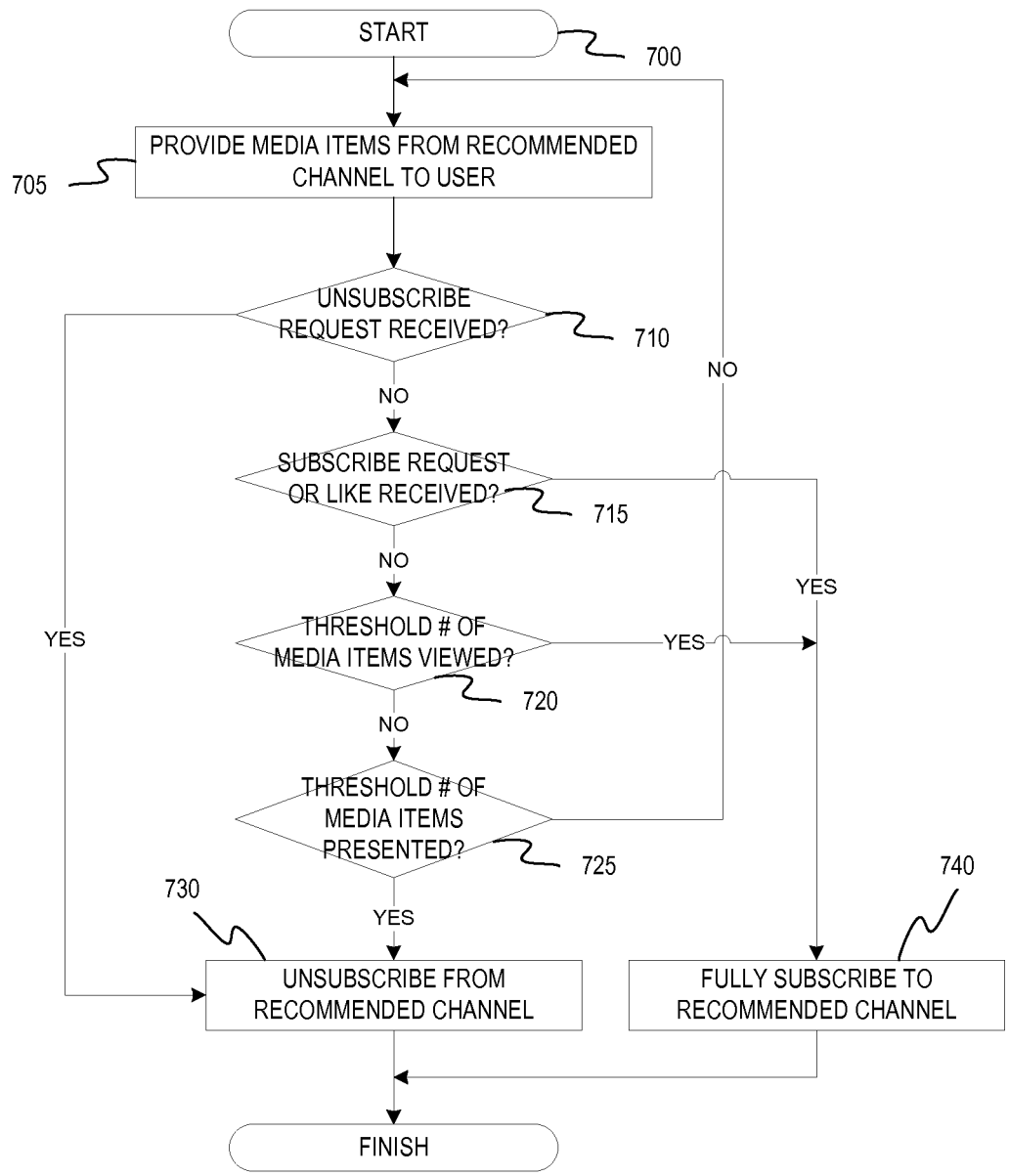
FIG. 7 is a flow diagram illustrating a method of subscribing to a channel, in accordance with a further embodiment of the present disclosure.

FIGS. 5-7 are flow diagrams illustrating methods of subscribing to channels. For simplicity of explanation, the methods are depicted and described as a series of acts. However, acts in accordance with this disclosure can occur in various orders and/or concurrently and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

FIG. 5 is a flow diagram illustrating a method 500 of subscribing to a channel, in accordance with one embodiment of the present disclosure. The method 500 may be performed by processing logic that comprises hardware (e.g., circuitry, dedicated logic, programmable logic, microcode, etc.), software (e.g., instructions run on a processor to perform hardware simulation), or a combination thereof. In one embodiment, method 500 may be performed by a channel subscription module, as illustrated in FIGS. 3 and 4.

Referring to FIG. 5, the method 500 begins at block 505 where the method identifiers a first user of a content sharing platforms. For example, the method 500 may identifier a first user in order to temporarily subscribe the first user to one or more recommended channels. At block 510, the method 500 identifies one or more recommended channels for the first user. For example, the method 500 may identify recommended channels based on personal information and/or demographic information voluntarily provided by the first user. In another example, the method 500 may identify recommended channels based on the content of user interactions (e.g., emails, SMS messages, chat messages, text messages, posts, etc.) between the first user and other users. In a further example, the method 500 may identify recommended channels by calculating affinity scores between the first user and the other users, identifying a subset of the other users based on the affinity scores (e.g., selecting affinity scores over a certain threshold or selecting a few of the highest affinity scores) and identifying the one or more recommended channels based on the subset of users (e.g., identifying channels that the subset of users accessed, subscribed to, and/or that belong to the subset of users).

At block 515, the method 500 temporarily subscribes the user to the one or more recommended channels. In one embodiment, at block 520, the method 500 provides media items from the one or more recommended channels to the user. For example, the method 500 may present media items from the one or more recommended channels to the user on an activity feed of the user (as illustrated in FIG. 1). In another embodiment, at block 520, the method 500 may provide the user with access to the media items. For example, a first server may grant access to the media items, but the media items are received from a second server. The user may view their activity feed using the GUI of a media viewer (as illustrated in FIG. 1). At block 525, the method 500 may optionally provide icons (e.g., graphics, images, and/or other visual indicators) to the GUI to indicate that the media items are from the one or more recommended channels. After block 525, the method 500 ends.

FIG. 6 is a flow diagram illustrating a method 600 of subscribing to a channel, in accordance with another embodiment of the present disclosure. The method 600 may be performed by processing logic that comprises hardware (e.g., circuitry, dedicated logic, programmable logic, microcode, etc.), software (e.g., instructions run on a processor to perform hardware simulation), or a combination thereof. In one embodiment, method 600 may be performed by a channel subscription module, as illustrated in FIGS. 3 and 4.

Referring back to FIG. 6, the method 600 begins at block 605 where media items from a recommended channel are provided to the user (e.g., via an activity feed as illustrated in FIG. 2). In one embodiment, the user may be provided access to the media items at block 605. At block 610 the method 600 determines whether user input requesting to unsubscribe from the recommended channel was received. If the method 600 receives user input requesting to unsubscribe from the recommended channel the method 600 proceeds to block 630 where the method 600 unsubscribes from the recommended channel. After block 630, the method 600 ends. If the method 600 does not user input requesting to unsubscribe from the recommended channel the method 600 proceeds to block 615 where the method 600 determines whether user input requesting to subscribe to the recommended channel was received or whether a "like" (e.g., user input indicating that the user likes a media item) was received. If the method 600 receives a "like" or a user request to subscribe, the method 600 proceeds to block 640 where the method 600 subscribes to the recommended channel. After block 640, the method 600 ends.

If the method 600 does not receive a "like" or a user request to subscribe, the method 600 proceeds to block 620 where the method 600 determines whether a threshold number of media items from the recommended channel were viewed. For example, the method 600 may determine whether three media items from the recommended channel were viewed by the user. If the threshold number of media items (e.g., three) was viewed by the user, the method 600 proceeds to block 640 where the method 600 subscribes to the recommended channel. After block 640, the method 600 ends. If the user has not viewed the threshold number of media items from the recommended channel, the method 600 proceeds to block 625 where the method 600 determines whether a threshold period of time (e.g., one week, ten days, etc.) has passed. If the threshold period of time has not passed, the method 600 proceeds back to block 605. If the threshold period of time has passed, the method 600 proceeds to block 630, where the where the method 600 unsubscribes from the recommended channel. After block 630, the method 600 ends.

FIG. 7 is a flow diagram illustrating a method 700 of subscribing to a channel, in accordance with a further embodiment of the present disclosure. The method 700 may be performed by processing logic that comprises hardware (e.g., circuitry, dedicated logic, programmable logic, microcode, etc.), software (e.g., instructions run on a processor to perform hardware simulation), or a combination thereof. In one embodiment, method 700 may be performed by a channel subscription module, as illustrated in FIGS. 3 and 4.

Referring back to FIG. 7, the method 700 begins at block 705 where media items from a recommended channel are provided to the user (e.g., via an activity feed as illustrated in FIG. 2). In one embodiment, the user is provided access to the media items at block 705. At block 710 the method 700 determines whether user input requesting to unsubscribe from the recommended channel was received. If the method 700 receives user input requesting to unsubscribe from the recommended channel the method 700 proceeds to block 730 where the method 700 unsubscribes from the recommended channel. After block 730, the method 700 ends. If the method 700 does not user input requesting to unsubscribe from the recommended channel the method 700 proceeds to block 715 where the method 700 determines whether user input requesting to subscribe to the recommended channel was received or whether a "like" (e.g., user input indicating that the user likes a media item) was received. If the method 700 receives a "like" or a user request to subscribe, the method 700 proceeds to block 740 where the method 700 subscribes to the recommended channel. After block 740, the method 700 ends.

If the method 700 does not receive a "like" or a user request to subscribe, the method 700 proceeds to block 720 where the method 700 determines whether a threshold number of media items from the recommended channel were viewed. For example, the method 700 may determine whether three media items from the recommended channel were viewed by the user. If the threshold number of media items (e.g., five) was viewed by the user, the method 700 proceeds to block 740 where the method 700 subscribes to the recommended channel. After block 740, the method 700 ends. If the user has not viewed the threshold number of media items from the recommended channel, the method 700 proceeds to block 725 where the method 700 determines whether a threshold number of media items (e.g., three) has been presented to the user. If the threshold number of media items (e.g., three) has not been presented to the user (e.g., three impressions of media items from the recommended channel have not occurred), the method 700 proceeds back to block 705. If the threshold number of media items has been presented to the user, the method 700 proceeds to block 730, where the where the method 700 unsubscribes from the recommended channel. After block 730, the method 700 ends.

Figure 8:
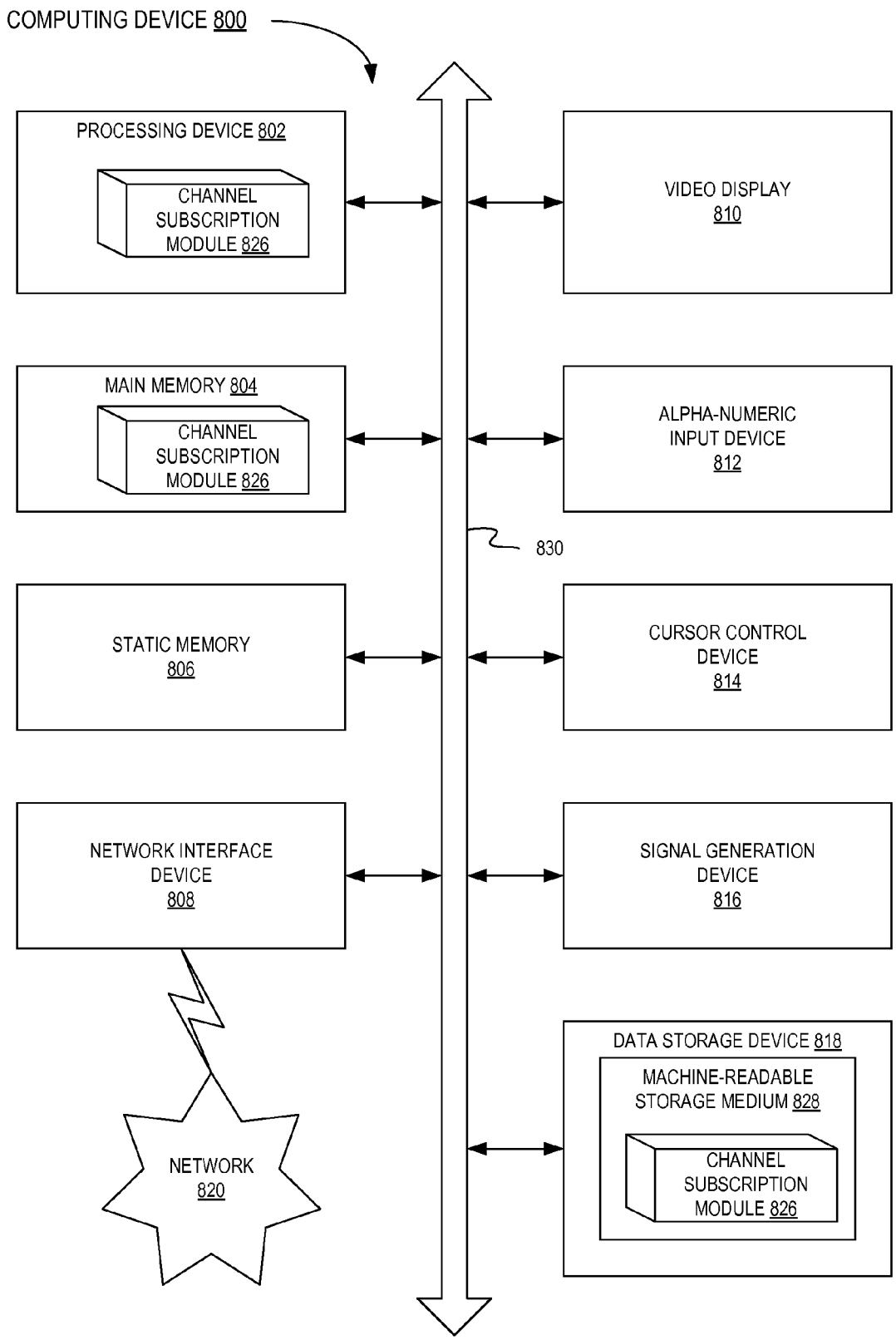
FIG. 8 is a block diagram of an example computing device that may perform one or more of the operations described herein.

FIG. 8 illustrates a diagrammatic representation of a machine in the example form of a computing device 800 within which a set of instructions, for causing the machine to perform any one or more of the methodologies discussed herein, may be executed. The computing device 800 may be a mobile phone, a smart phone, a netbook computer, a rackmount server, a router computer, a server computer, a personal computer, a mainframe computer, a laptop computer, a tablet computer, a desktop computer etc., within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computing device 800 includes a processing device (e.g., a processor) 802, a main memory 804 (e.g., read-only memory (ROM), flash memory, dynamic random access memory (DRAM) such as synchronous DRAM (SDRAM)), a static memory 806 (e.g., flash memory, static random access memory (SRAM)) and a data storage device 818, which communicate with each other via a bus 830.

Processing device 802 represents one or more general-purpose processing devices such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 802 may also be one or more special-purpose processing devices such as an application specific integrated circuit (ASIC), a field programmable gate array (FPGA), a digital signal processor (DSP), network processor, or the like. The processing device 802 is configured to execute channel subscription module 826 for performing the operations and steps discussed herein.

The computing device 800 may further include a network interface device 808 which may communicate with a network 820. The computing device 800 also may include a video display unit 810 (e.g., a liquid crystal display (LCD) or a cathode ray tube (CRT)), an alphanumeric input device 812 (e.g., a keyboard), a cursor control device 814 (e.g., a mouse) and a signal generation device 816 (e.g., a speaker). In one embodiment, the video display unit 810, the alphanumeric input device 812, and the cursor control device 814 may be combined into a single component or device (e.g., an LCD touch screen).

The data storage device 818 may include a computer-readable storage medium 828 on which is stored one or more sets of instructions (e.g., channel subscription module 826) embodying any one or more of the methodologies or functions described herein. The channel subscription module 826 may also reside, completely or at least partially, within the main memory 804 and/or within the processing device 802 during execution thereof by the computing device 800, the main memory 804 and the processing device 802 also constituting computer-readable media. The instructions may further be transmitted or received over a network 820 via the network interface device 808.

While the computer-readable storage medium 828 is shown in an example embodiment to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media and magnetic media.

In the above description, numerous details are set forth. It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art.

An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying," "subscribing," "providing," "determining," "unsubscribing," "receiving," "generating," "changing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

The above description sets forth numerous specific details such as examples of specific systems, components, methods and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth above are merely examples. Particular implementations may vary from these example details and still be contemplated to be within the scope of the present disclosure.

It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A computer-implemented method, comprising:
    identifying a first user of a content sharing platform, wherein the content sharing platform provides a plurality of content channels and wherein each content channel of the plurality of content channels comprises at least one media item;
    identifying one or more recommended content channels of the content sharing platform;
    initiating a temporary subscription of the first user to the one or more recommended content channels, the temporary subscription corresponding to a presentation of a threshold number of media items from the one or more recommended channels to the first user;
    providing access to a plurality of media items from the one or more recommended content channels to the first user during the temporary subscription; and
    terminating the temporary subscription of the first user to the one or more recommended content channels in response to determining that the presentation of the threshold number of media items from the one or more recommended channels to the first user does not result in a consumption of media items from the one or more recommended content channels by the first user.

2. The computer-implemented method of claim 1, further comprising:
    generating a feed using at least one of the plurality of media items.

3. The computer-implemented method of claim 1, further comprising:
    providing visual indicators for the plurality of media items, wherein the visual indicators denote that the plurality of media items are from the one or more recommended content channels.

4. The computer-implemented method of claim 1, further comprising:

determining that a threshold period of time has passed and that the user has not viewed media items from the one or more recommended content channels; and unsubscribing the user from the one or more recommended content channels.

5. The computer-implemented method of claim 1, further comprising:

receiving user input indicative of a request from the user to unsubscribe from the one or more recommended content channels; and unsubscribing the first user from the one or more recommended content channels.

6. The computer-implemented method of claim 1, further comprising:

determining that the first user has viewed a predefined number of media items from the one or more recommended content channels; and changing the temporary subscription to a normal subscription to the one or more recommended content channels.

7. The computer-implemented method of claim 1, further comprising:

receiving user input indicating that the first user approves of a first media item from the one or more recommended content channels; and changing the temporary subscription to a normal subscription to the one or more recommended content channels based on the user input.

8. The computer-implemented method of claim 1, further comprising:

receiving user input indicative of a request from the user to subscribe to the one or more recommended content channels; and changing the temporary subscription to a normal subscription to the one or more recommended content channels.

9. The computer-implemented method of claim 1, wherein identifying the one or more recommended content channels comprises:

generating a plurality of affinity scores based on user interactions between the first user and a plurality of other users, each affinity score indicative of a level of connection between the first user and one user from the plurality of other users;

identifying a subset of the plurality of other users based on the plurality of affinity scores; and identifying the one or more recommended content channels based on the subset of the plurality of other users.

10. An apparatus, comprising:

a memory;

a processor, coupled to the memory, the processor to:

identify a first user of a content sharing platform, wherein the content sharing platform provides a plurality of content channels and wherein each content channel of the plurality of content channels comprises at least one media item;

identify one or more recommended content channels of the content sharing platform;

initiate a temporary subscription of the first user to the one or more recommended content channels, the temporary subscription corresponding to a presentation of a threshold number of media items from the one or more recommended channels to the first user;

provide access to a plurality of media items from the one or more recommended content channels to the first user during the temporary subscription; and terminate the temporary subscription of the first user to the one or more recommended content channels in response to determining that the presentation of the threshold number of media items from the one or more recommended channels to the first user does not result in a consumption of media items from the one or more recommended content channels by the first user.

11. The apparatus of claim 10, wherein the processor is further to:

determine that a threshold period of time has passed and that the user has not viewed media items from the one or more recommended content channels; and unsubscribe the user from the one or more recommended content channels.

12. The apparatus of claim 10, wherein the processor is further to:

receive user input indicative of a request from the user to unsubscribe from the one or more recommended content channels; and unsubscribe the first user from the one or more recommended content channels.

13. The apparatus of claim 10, wherein the processor is further to:

determine that the first user has viewed the threshold number of media items from the one or more recommended content channels; and change the temporary subscription to a normal subscription to the one or more recommended content channels.

14. The apparatus of claim 10, wherein the processor is further to:

receive user input indicating that the first user likes a first media item from the one or more recommended content channels; and change the temporary subscription to a normal subscription to the one or more recommended content channels based on the user input.

15. The apparatus of claim 10, wherein the processor is further to:

receive user input indicative of a request from the user to subscribe to the one or more recommended content channels; and change the temporary subscription to a normal subscription to the one or more recommended content channels.

16. The apparatus of claim 10, wherein the processor is to identify the one or more recommended content channels by:

generating a plurality of affinity scores based on user interactions between the first user and a plurality of other users, each affinity score indicative of a level of connection between the first user and one user from the plurality of other users;

identifying a subset of the plurality of other users based on the plurality of affinity scores; and identifying the one or more recommended content channels based on the subset of the plurality of other users.

17. A non-transitory computer readable storage medium comprising instructions that, when executed by a processing device, cause the processor to perform operations comprising:

identifying a first user of a content sharing platform, wherein the content sharing platform provides a plurality of content channels and wherein each content channel of the plurality of content channels comprises at least one media item;

identifying one or more recommended content channels of the content sharing platform;

initiating a temporary subscription of the first user to the one or more recommended content channels, the temporary subscription corresponding to a presentation of a threshold number of media items from the one or more recommended channels to the first user;

providing access to a plurality of media items from the one or more recommended content channels to the first user during the temporary subscription; and terminating the temporary subscription of the first user to the one or more recommended content channels in response to determining that the presentation of the threshold number of media items from the one or more recommended channels to the first user does not result in a consumption of media items from the one or more recommended content channels by the first user.

18. The non-transitory computer readable storage medium of claim 17, wherein the operations further comprise:

determining that a threshold period of time has passed and that the user has not viewed media items from the one or more recommended content channels; and unsubscribing the user from the one or more recommended content channels.

19. The non-transitory computer readable storage medium of claim 17, wherein the operations further comprise:

receiving user input indicative of a request from the user to unsubscribe from the one or more recommended content channels; and unsubscribing the first user from the one or more recommended content channels.

20. The non-transitory computer readable storage medium of claim 17, wherein the operations further comprise:

determining that the first user has viewed the threshold number of media items from the one or more recommended content channels; and changing the temporary subscription to a normal subscription to the one or more recommended content channels.

21. The non-transitory computer readable storage medium of claim 17, wherein the operations further comprise:

receiving user input indicating that the first user likes a first media item from the one or more recommended content channels; and changing the temporary subscription to a normal subscription to the one or more recommended content channels based on the user input.

22. The non-transitory computer readable storage medium of claim 17, wherein the operations further comprise:

receiving user input indicative of a request from the user to subscribe to the one or more recommended content channels; and changing the temporary subscription to a normal subscription to the one or more recommended content channels.

23. The non-transitory computer readable storage medium of claim 17, wherein identifying the one or more recommended content channels comprises:

generating a plurality of affinity scores based on user interactions between the first user and a plurality of other users, each affinity score indicative of a level of connection between the first user and one user from the plurality of other users;

identifying a subset of the plurality of other users based on the plurality of affinity scores; and identifying the one or more recommended content channels based on the subset of the plurality of other users.

24. The computer-implemented method of claim 1, further comprising:

changing the temporary subscription to a full subscription to the one or more recommended content channels in response to determining that the first user consumes a threshold number of media items from the one or more recommended content channels over a threshold period of time.

25. The apparatus of claim 10, the processor further to change the temporary subscription to a full subscription to the one or more recommended content channels in response to determining that the first user consumes a threshold number of media items from the one or more recommended content channels over a threshold period of time.

26. The non-transitory computer readable storage medium of claim 17, wherein the operations further comprise changing the temporary subscription to a full subscription to the one or more recommended content channels in response to determining that the first user consumes a threshold number of media items from the one or more recommended content channels over a threshold period of time.

* * * * *